UNITED STATES PATENT OFFICE.

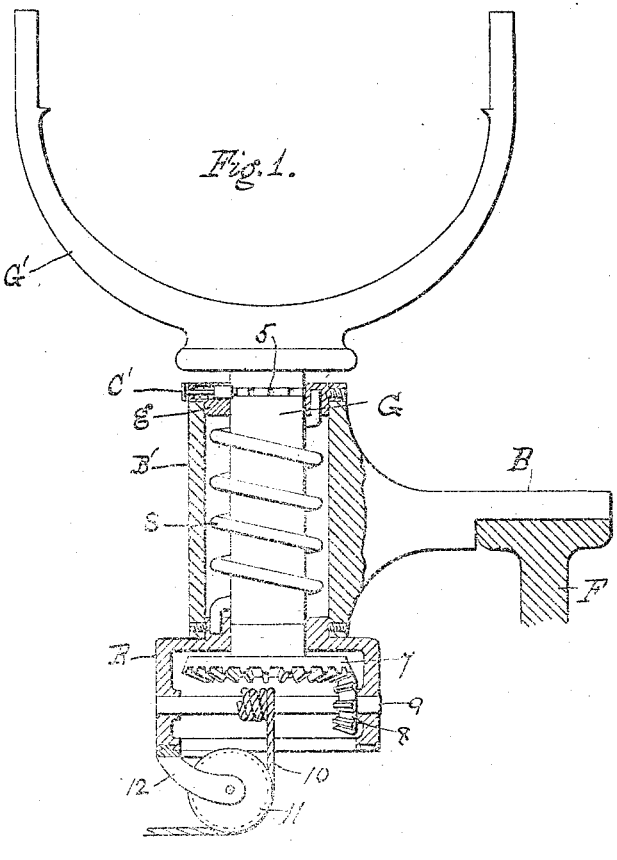

WILLIAM D. FORBES, OF MORRISTOWN, NEW JERSEY.

HEADLIGHT FOR AUTOMOBILES, &c.

No. 880,289.  Specification of Letters Patent.  Patented Feb. 25, 1908.

Application filed May 18, 1907. Serial No. 374,418.

*To all whom it may concern:*

Be it known that I, WILLIAM D. FORBES, a citizen of the United States of America, and residing at Morristown, county of Essex, and State of New Jersey, have invented certain new and useful Improvements in Headlights for Automobiles, &c., of which the following is a specification.

My invention relates to the control of headlights on automobiles and other vehicles, whereby the lights are automatically turned as the vehicle turns to throw the rays of light in the direction in which the vehicle is moving in going around a corner.

The object of my invention is to provide a simple, inexpensive, easily applied and efficient device for effecting this automatic control.

In the accompanying drawings Figure 1 is a vertical section showing an embodiment of my invention; Fig. 2 is a plan view of a part; Fig. 3 is a perspective view of a part of the ward end of an automobile showing the application of my invention.

In this Fig. 3, A illustrates one of the front steerable wheels of an automobile and C is one of the lamps carried by a bracket B, which may be mounted on any suitable part of the frame or chassis F.

At D I have indicated the usual connecting rod extending across the front of the car and connecting the knuckle E of one steering wheel A with the like knuckle of the corresponding wheel on the other side of the car.

As usual the lamp C is suitably mounted in the forked upper end $G^1$ of a supporting stem G, carried by the bracket B, but instead of being firmly secured to the bracket, it is mounted so as to turn therein. To the bracket thus swiveled I connect a spring which tends to turn the headlight in one direction while a cord or the like flexible connection to the steering wheel connections will tend to retain or move it in the other direction.

As shown in Fig. 1, the tubular part $B^1$ of the bracket is made sufficiently large to accommodate in addition to the straight portion of the stem G, a spiral spring S around that stem. The lower end of the spring is secured in a ring R, which is suitably secured to the lower end of the tubular part $B^1$ of the bracket, while the upper end of the spring is fastened in a coller $g$ which bears on the top of the tubular part $B^1$ and is fastened to the stem G. I prefer to fasten this collar to the stem G adjustably, as by providing ratchet teeth 5 on the stem to be engaged by a spring pressed latch $C^1$ carried by the coller. By this means the tension of the spring may be adjusted.

On the lower end of the stem G is secured a bevel gear 7 gearing into a bevel pinion 8 on a spindle 9, on which is wound a cord 10, one end of the cord being secured to the spindle. The cord 10 from the spindle 9 may be led over a guide pulley 11 carried by a bracket 12, which is fitted to the underside of the ring R in any suitable way, and thence the cord leads to and is connected with any suitable moving part in connection with the steering wheels. In Fig. 3 I have shown the cord connected at $d$ (adjustably, by preference) to the rod D connecting the knuckle of one wheel A with the knuckle of the other wheel. Thus the movement of the rod D in the direction of the arrow, Fig. 3 when the wheels of the car are steered to the driver's right will cause the headlight to be correspondingly turned against the action of the spring S, Fig. 1. This spring S will cause a movement of the lamp in the opposite direction when the wheels of the car are steered back again towards the left.

In this specification I use the term "cord" in a sufficiently wide sense to embrace also equivalent flexible connecting means such as a chain or wire.

I claim as my invention:

1. The combination of a vehicle having steering wheels and a swiveled headlight with a spring tending to turn the headlight in one direction and a flexible connection to the steering wheels in the opposite direction.

2. The combination of a vehicle having steering wheels and a headlight with a swiveled supporting stem for the latter, a spiral spring around the stem and tending to turn the headlight in one direction and a flexible connection to the steering wheels in the opposite direction.

3. The combination of a vehicle having steering wheels and a headlight with a swiveled supporting stem for the latter, a spiral spring tending to turn the headlight in one direction, a spindle having a cord wound on
5 it and connected to the steering wheels and gearing between said stem and spindle.

In testimony whereof I have signed my name to this specification, in the presence of two subscribing witnesses.

WILLIAM D. FORBES.

Witnesses:
 WALTER ABBE,
 WILLIAM ABBE.